(12) United States Patent
Tsuchiya

(10) Patent No.: US 8,299,745 B2
(45) Date of Patent: Oct. 30, 2012

(54) DRIVING CONTROL APPARATUS FOR STEPPING MOTOR AND IMAGE FORMING APPARATUS

(75) Inventor: Toshikazu Tsuchiya, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 394 days.

(21) Appl. No.: 12/760,023

(22) Filed: Apr. 14, 2010

(65) Prior Publication Data

US 2010/0272485 A1 Oct. 28, 2010

(30) Foreign Application Priority Data

Apr. 24, 2009 (JP) ................................. 2009-106945
Apr. 8, 2010 (JP) ................................. 2010-089857

(51) Int. Cl.
*H02P 8/18* (2006.01)

(52) U.S. Cl. ........................................ 318/696; 318/504

(58) Field of Classification Search ................... 318/478, 318/479, 504, 685, 696
See application file for complete search history.

(56) References Cited

U.S. PATENT DOCUMENTS

| | | | |
|---|---|---|---|
| 5,841,261 A | 11/1998 | Nojima et al. | |
| 6,274,996 B1 * | 8/2001 | Wada | 318/696 |
| 6,642,687 B2 * | 11/2003 | Aoshima | 318/696 |
| 6,713,985 B2 * | 3/2004 | Aoshima | 318/696 |
| 2005/0218857 A1 * | 10/2005 | Yamazaki et al. | 318/685 |

FOREIGN PATENT DOCUMENTS

JP 8-140398 5/1996

* cited by examiner

*Primary Examiner* — Bentsu Ro
(74) *Attorney, Agent, or Firm* — Fitzpatrick, Cella, Harper & Scinto

(57) ABSTRACT

A driving control apparatus for a stepping motor is provided by which the productivity is improved while keeping the driving performance of the motor at a required level. To accomplish this, a driving control apparatus of the present invention drives a stepping motor by switching an excitation current supplied to a coil of a predetermined phase between a first excitation current value, a second excitation current value greater than the first excitation current value, and a third excitation current value still greater than the second excitation current value. In a first mode for generating a first driving force by the stepping motor, the first through third excitation current values are sequentially switched, whereas in a second mode for generating a second driving force smaller than the first driving force, the first and second excitation current values are sequentially switched.

6 Claims, 13 Drawing Sheets

| IN0/IN2 | IN1/IN3 | CURRENT VALUE | NAME |
|---|---|---|---|
| 0 | 0 | 100% | THIRD EXCITATION CURRENT |
| 1 | 0 | 67% | SECOND EXCITATION CURRENT |
| 0 | 1 | 33% | FIRST EXCITATION CURRENT |
| 1 | 1 | 0% | |

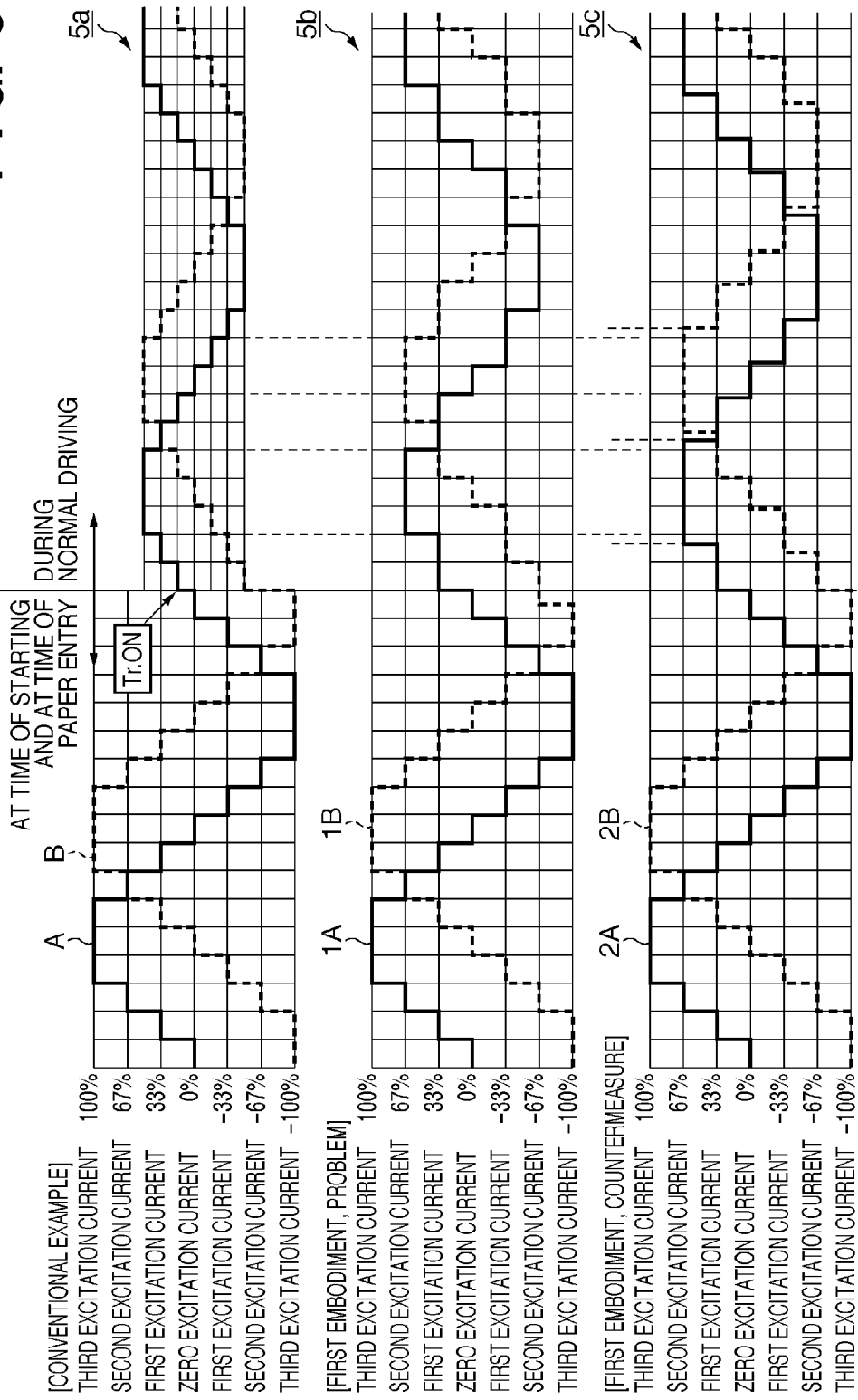

F I G. 7B

| CONTROL CLOCK | Aout(%) | IN0 | IN1 | PHA | Bout(%) | IN2 | IN3 | PHB |
|---|---|---|---|---|---|---|---|---|
| 1 | 0 | 1 | 1 | 1 | -67 | 1 | 0 | 0 |
| 2~10 | 33 | 0 | 1 | 1 | -67 | 1 | 0 | 0 |
| 11~14 | 33 | 0 | 1 | 1 | -33 | 0 | 1 | 0 |
| 15~23 | 67 | 1 | 0 | 1 | -33 | 0 | 1 | 0 |
| 24~33 | 67 | 1 | 0 | 1 | 0 | 1 | 1 | 1 |
| 34~42 | 67 | 1 | 0 | 1 | 33 | 0 | 1 | 1 |
| 43~46 | 33 | 0 | 1 | 1 | 33 | 0 | 1 | 1 |
| 47~55 | 33 | 0 | 1 | 1 | 67 | 1 | 0 | 1 |
| 56~65 | 0 | 1 | 1 | 1 | 67 | 1 | 0 | 1 |
| 66~74 | -33 | 0 | 1 | 0 | 67 | 1 | 0 | 1 |
| 75~78 | -33 | 0 | 1 | 0 | 33 | 0 | 1 | 1 |
| 79~87 | -67 | 1 | 0 | 0 | 33 | 0 | 1 | 1 |
| 88~97 | -67 | 1 | 0 | 0 | 0 | 1 | 1 | 1 |
| 98~106 | -67 | 1 | 0 | 0 | -33 | 0 | 1 | 0 |
| 107~110 | -33 | 0 | 1 | 0 | -33 | 0 | 1 | 0 |
| 111~119 | -33 | 0 | 1 | 0 | -67 | 1 | 0 | 0 |
| 120~128 | 0 | 1 | 1 | 1 | -67 | 1 | 0 | 0 |

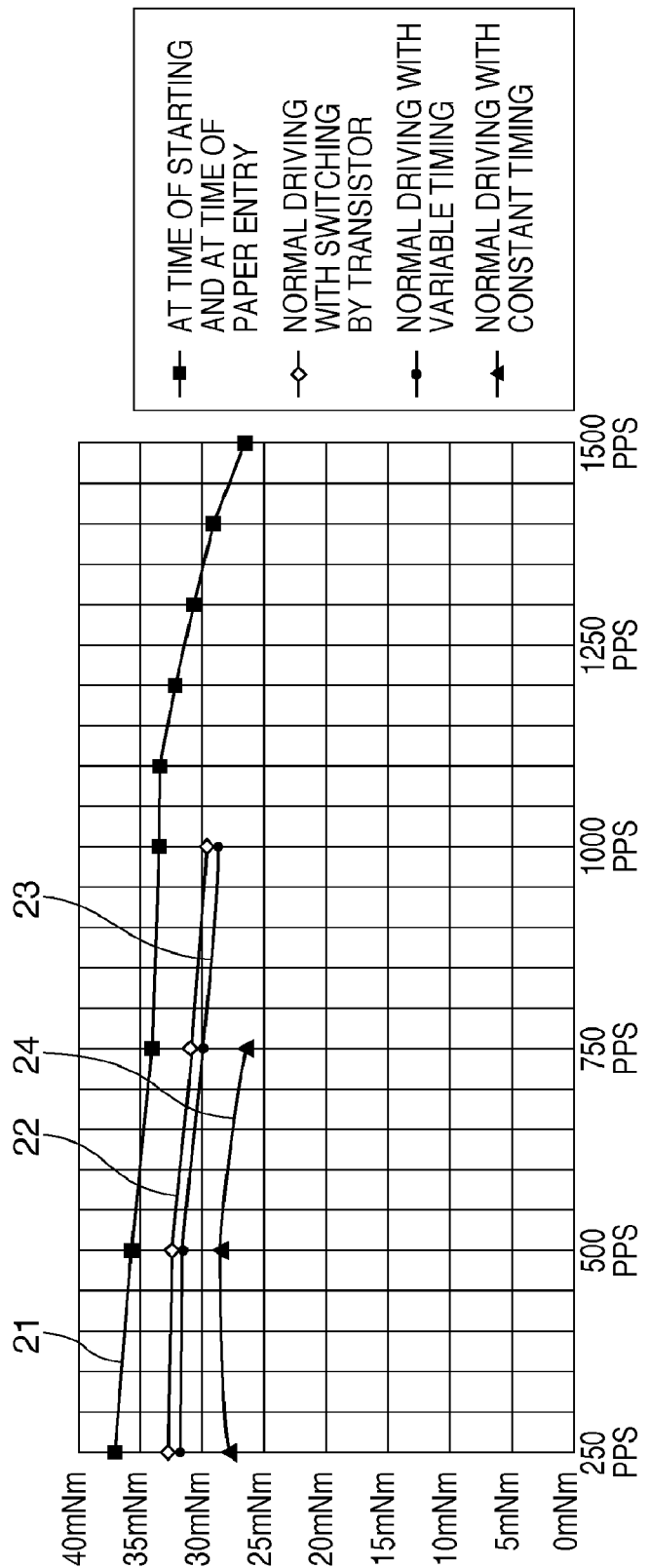

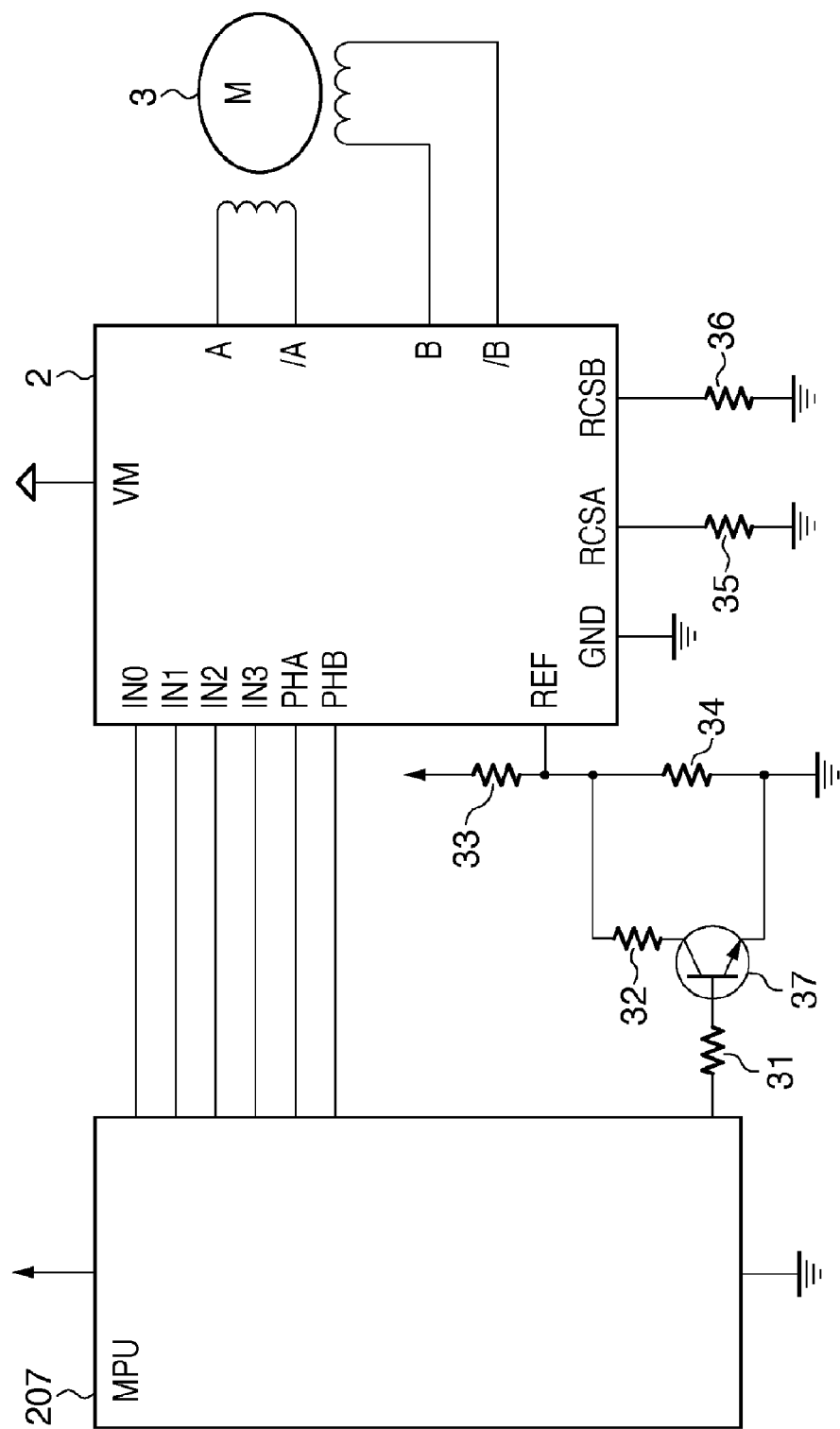
F I G. 11

DRIVING CONTROL APPARATUS FOR STEPPING MOTOR AND IMAGE FORMING APPARATUS

BACKGROUND OF THE INVENTION

1. Field of the Invention

The present invention relates to driving control of a stepping motor.

2. Description of the Related Art

Conventionally, driver circuits of stepping motors that are used in image forming apparatuses such as laser beam printers and laser facsimile machines have been commonly known (Japanese Patent Laid-Open No. 8-140398). In Japanese Patent Laid-Open No. 8-140398, vibration and noise of a motor are mitigated while securing a required level of driving performance from the motor, by causing phase currents to approximate a sinusoidal waveform.

However, according to the disclosure of Japanese Patent Laid-Open No. 8-140398, a plurality of transistors is used in order to generate phase currents having a sinusoidal waveform, and the presence of these transistors has been an obstacle to productivity improvements.

In connection with the above-described problem, it is desired to simplify a component related to switching of an excitation current in order to improve the productivity, while keeping the driving performance of a motor at a required level.

SUMMARY OF THE INVENTION

One aspect of the present invention provides a driving control apparatus for driving a stepping motor by switching an excitation current supplied to a coil of a predetermined phase between a first excitation current value, a second excitation current value greater than the first excitation current value, and a third excitation current value still greater than the second excitation current value, the driving control apparatus comprising: a driving control unit that sequentially switches, for the supplied excitation current, at least the first through third excitation current values in a first mode for generating a first driving force by the stepping motor, and sequentially switches, for the supplied excitation current, the first and second excitation current values in a second mode for generating a second driving force smaller than the first driving force, wherein, in the second mode, the driving control unit sequentially switches the excitation current values at such timings that in a single cycle of driving with the excitation current, a time for which the second excitation current value is applied is longer than $3/4$ and shorter than $5/2$ of a time for which the first excitation current value is applied.

According to the present invention, the productivity can be improved by simplifying a component related to switching of the excitation current, while keeping the driving performance of a motor at a required level.

Further features of the present invention will become apparent from the following description of exemplary embodiments (with reference to the attached drawings).

BRIEF DESCRIPTION OF THE DRAWINGS

FIG. 5 is a diagram showing waveforms of excitation currents according to the embodiment of the present invention.

FIG. 7B is a diagram showing an excitation current table according to the embodiment of the present invention.

FIG. 8 is a diagram showing torque characteristics corresponding to a conventional example and a problem and countermeasure of the embodiment of the present invention.

FIG. 11 is a circuit diagram according to a prerequisite technique.

DESCRIPTION OF THE EMBODIMENTS

Figure 1:
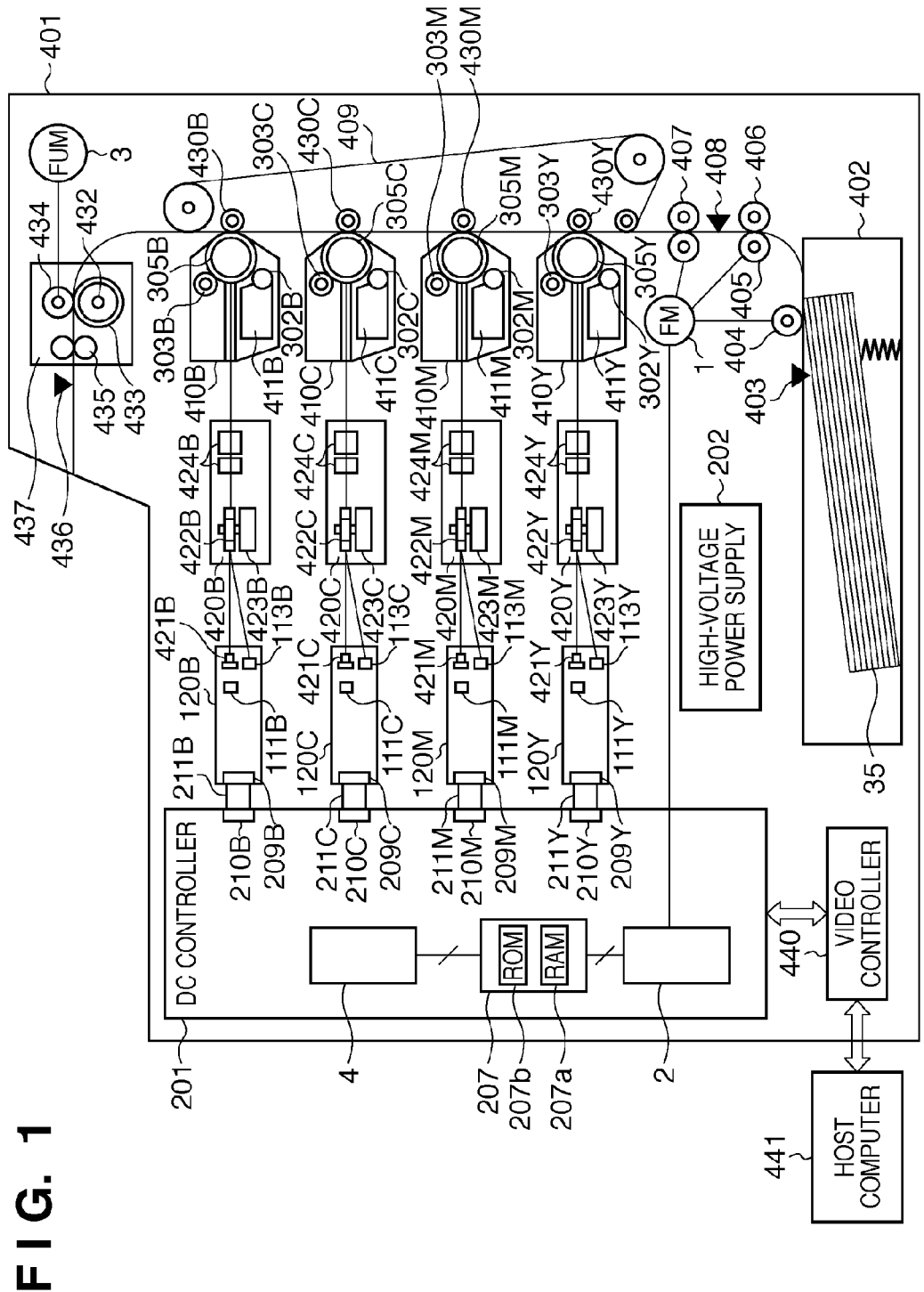
FIG. 1 is a diagram showing the configuration of a color laser printer according to an embodiment of the present invention.

Hereinafter, preferred embodiments of the present invention will be described in detail by way of example with reference to the accompanying drawings. However, constituent elements described in the embodiments are provided for illustrative purpose only, and it should not be construed that the scope of the present invention is limited only to those constituent elements.

Prerequisite Technique

A technique that is a prerequisite for the present invention will be described with reference to FIG. 11. In FIG. 11, 2 indicates a stepping motor driver. A single-chip microcomputer (hereinafter referred to as MPU) 207 is connected to the stepping motor driver 2 via six signal lines respectively connected to IN0, IN1, IN2, IN3, PHA, and PHB. The stepping motor driver 2 and the MPU 207 cooperate to function as a control unit that controls a stepping motor 3.

IN0, IN1, IN2, and IN3 indicate input pins for setting an excitation current. A PHA input pin and a PHB input pin are input pins for controlling the phase of phase A and phase B, respectively. Moreover, an REF input pin is an input pin for setting a maximum current value. In a state in which a maximum excitation current is set, a voltage divided by a resistor 33 and a resistor 34 is applied to this REF input pin. At this time, a transistor 37 is off.

The MPU 207 turns on the transistor 37 when setting the excitation current value to a normal status. Once the transistor 37 is turned on, a resistor 32 is connected to the resistor 34 while being offset by about 0.2 V, which is the collector-emitter saturation voltage of the transistor 37, and the voltage value at the REF terminal decreases. Thus, the maximum excitation current of the stepping motor driver 2 decreases in response to that voltage value. A resistor 31 is a base resistor of the transistor 37. A resistor 35 is a resistor for phase A current detection, and a resistor 36 is a resistor for phase B current detection.

Figure 12:
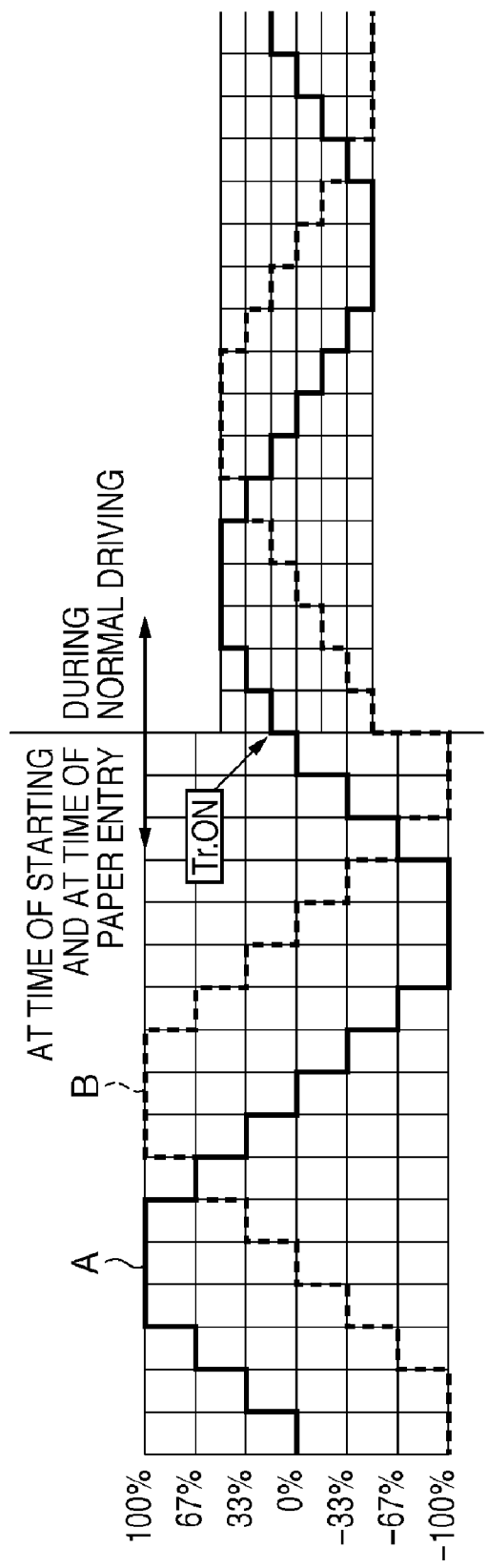
FIG. 12 is a diagram showing a waveform of an excitation current according to the prerequisite technique.

FIG. 12 is a diagram showing a waveform of an excitation current of the stepping motor 3. A (the solid line) represents a phase A excitation current, and B (the dashed line) represents a phase B excitation current. With respect to a control clock that determines the timing at which the excitation currents are switched, 16 clocks are used per cycle. Here, the control clock is a clock of a timer provided in the MPU and is generated through frequency division of a clock oscillated by a crystal oscillator in an oscillating unit of the MPU. The excitation currents are controlled by triggering an interrupt within the MPU using this clock. At the time of starting and at the timing when a heavy load is applied, that is, at the timing when paper enters, the transistor 37 is turned off, causing a large excitation current to be supplied. On the other hand, during normal driving, the transistor 37 is turned on, and causing driving to be performed with a decreased excitation current. In this manner, a large excitation current is supplied only when under heavy loads, and the maximum excitation current value is decreased when under normal loads. Thus, it is possible to secure a torque margin even during heavy loads and also reduce noise while suppressing temperature gains in the stepping motor and the driver.

Figure 13:
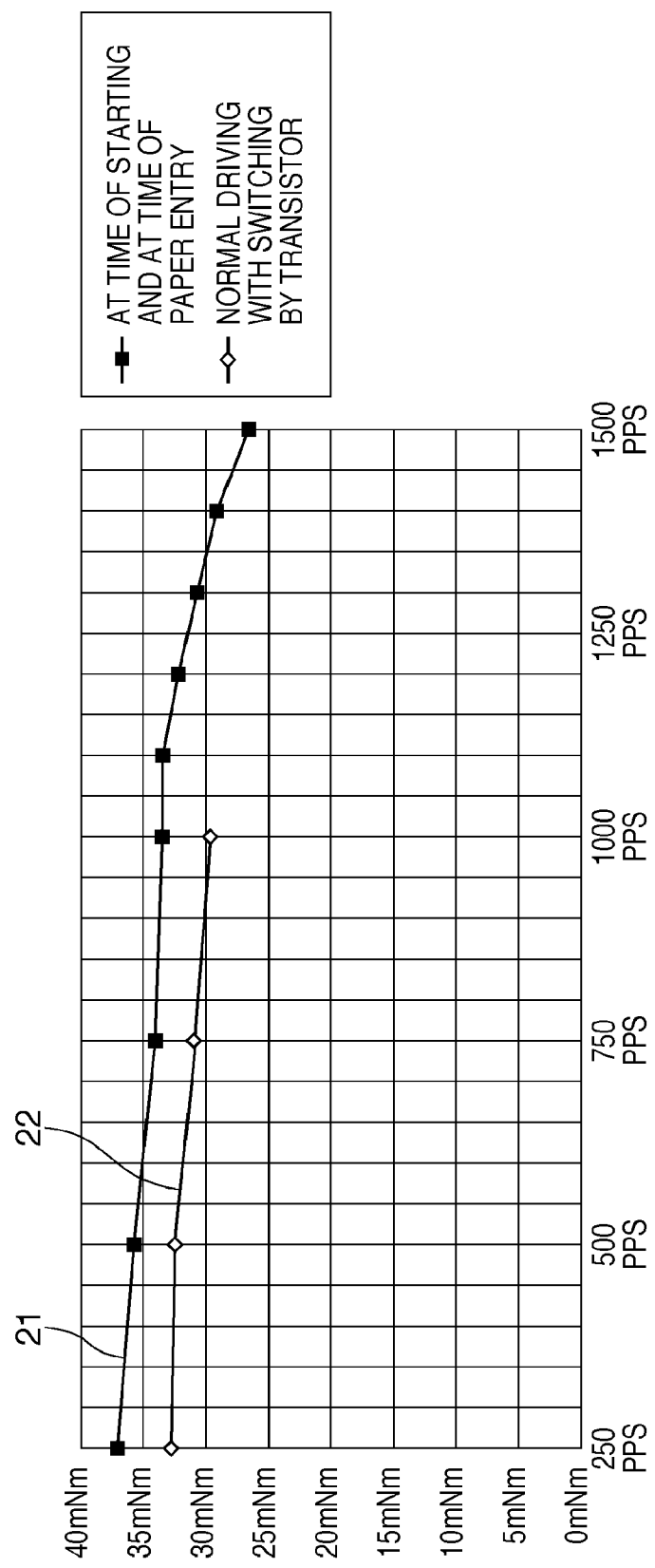
FIG. 13 is a diagram showing torque characteristics according to the prerequisite technique.

FIG. 13 is a diagram showing torque characteristics of the configuration in FIG. 12. The vertical axis represents the torque (mNm), and the horizontal axis represents the rotational speed (pps: pulses per second) of the stepping motor. 21 indicates a torque characteristic curve in the case where the transistor 37 is turned off and the stepping motor is driven with a first excitation current through a third excitation current. 22 indicates a torque characteristic curve in the case where the transistor 37 is turned on and the stepping motor is driven with the first excitation current through the third excitation current.

In contrast, the present invention realizes the above-described driving performance without using a transistor. Hereinafter, the embodiments of the present invention will be described in detail.

First Embodiment

First, a first embodiment of the present invention will be described. FIG. 1 is a diagram showing the configuration of a color laser printer of the present embodiment. 401 indicates a color laser printer, 402 indicates a deck for holding recording paper 30, 403 indicates a deck paper detection sensor that detects whether or not the recording paper 30 is present in the deck 402, and 404 indicates a pickup roller that draws out the recording paper 30 from the deck 402. 405 indicates a deck paper feed roller that conveys the recording paper 30 drawn out by the pickup roller 404, and 406 indicates a retard roller that is paired with the deck paper feed roller 405 and intended to prevent overlapping feed of the recording paper 30. A registration roller pair 407 that synchronously conveys the recording paper 30 and a pre-registration sensor 408 that detects the conveyance status of the recording paper 30 to the registration roller pair 407 are disposed downstream of the deck paper feed roller 405.

Moreover, an electrostatic adsorptive conveying transfer belt (hereinafter mentioned as ETB) unit provided with an ETB 409 is disposed downstream of the registration roller pair 407. A color image composed of toner images of four colors Y (yellow), M (magenta), C (cyan), and B (black) is formed on the ETB 409 in the following manner. That is, images formed by an image forming unit configured by process image forming cartridges 410 (Y, M, C, and B) and scanner units 420 (Y, M, C, and B) for the four colors Y, M, C, and B are sequentially transferred onto the ETB 409 one on top of another by transfer rollers 430 (Y, M, C, and B). Thereafter, a color image on the ETB 409 is transferred onto the recording paper 30. The recording paper 30 on which the color image has been formed is conveyed downstream. A fixing device 437 is provided downstream, where the toner image transferred onto the recording paper 30 is fixed by heat. The fixing device 437 has a pair of a fixing roller 433 in which a heater 432 for heating is provided and a pressure roller 434, and a fixed paper discharge roller pair 435 for conveying the recording paper 30 from the fixing roller. Furthermore, a fixed paper discharge sensor 436 that detects the conveyance status of recording paper from the fixing device 437 is provided.

Each scanner unit 420 (Y, M, C, or B) is configured by a semiconductor laser 421 (Y, M, C, or B), a polygon mirror 422 (Y, M, C, or B), a scanner motor 423 (Y, M, C, or B), and an imaging lens group 424 (Y, M, C, or B). The semiconductor lasers 421 (Y, M, C, and B) emit laser beams modulated based on respective image signals transmitted from a video controller 440. The polygon mirrors 422 (Y, M, C, and B) and the scanner motors 423 (Y, M, C, and B) scan the laser beams from the semiconductor lasers 421 (Y, M, C, and B) on photosensitive drums 305 (Y, M, C, and B). Each of the process image forming cartridges 410 (Y, M, C, and B) is provided with a configuration necessary for a known electrophotographic process. That is, each cartridge is provided with the photosensitive drum 305 (Y, M, C, or B), a charging roller 303 (Y, M, C, or B), a development roller 302 (Y, M, C, or B), and a toner container 411 (Y, M, C, or B). Moreover, the process image forming cartridges 410 (Y, M, C, and B) are configured so as to be detachable from the laser printer main body 401. Furthermore, upon receiving an image signal transmitted from a host computer 441 serving as an example of an external apparatus, the video controller 440 expands this image signal into bitmap data and generates an image signal for forming an image.

201 indicates a DC controller serving as a control unit of the laser printer 401. This DC controller 201 has an MPU 207 including a RAM (temporary storage device) 207*a* and a ROM (read-only storage device) 207*b*. The ROM 207*b* stores a control procedure of the MPU 207. Furthermore, the DC controller 201 has a non-volatile storage device (EEPROM) (not shown), various types of input/output control circuits (not shown), and the like. Moreover, 2 indicates a motor driver of a paper feed motor 1 (motor for sheet conveying) and drives the paper feed motor 1 in response to a command signal from the MPU 207. 4 indicates a motor driver of a fixing motor 3 (motor for fixing an image). 202 indicates a high-voltage power supply (piezoelectric transformer type high-voltage power supply unit). This high-voltage power supply 202 has a control unit (not shown) of a high-voltage power supply for charging, and a high-voltage power supply for development (not shown) corresponding to each process image forming cartridge 410 (Y, M, C, or B). Furthermore, the high-voltage power supply 202 has a high-voltage power supply for transfer employing a piezoelectric transformer capable of outputting a high voltage corresponding to each transfer roller 430 (Y, M, C, or B).

Figure 2:
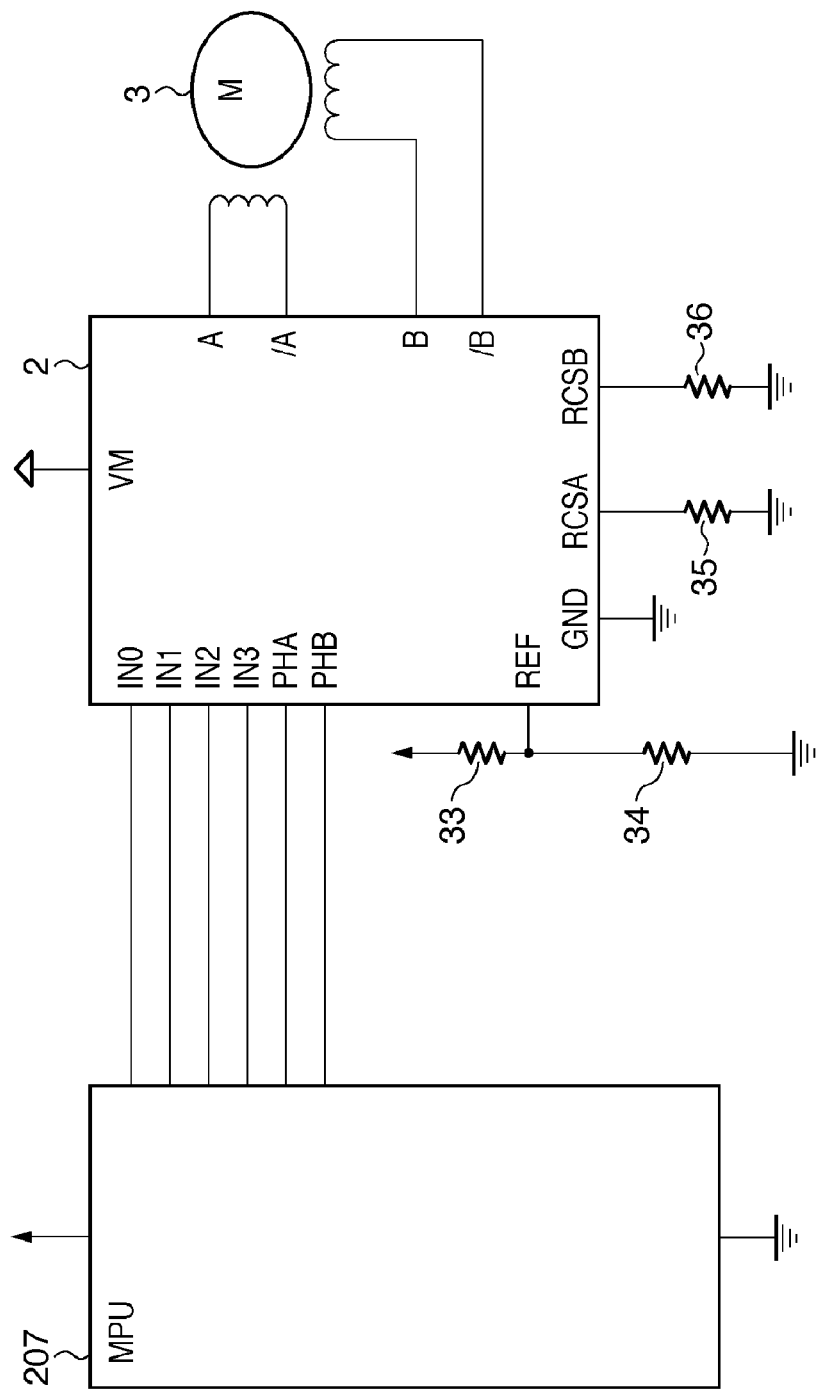
FIG. 2 is a circuit diagram according to the embodiment of the present invention.

Next, a circuit configuration of the present embodiment will be described using FIG. 2. FIG. 2 is a circuit diagram of the vicinity of the stepping motor driver according to the present embodiment. The difference from the prerequisite technique shown in FIG. 11 is that the transistor 37 and its peripheral resistors (31 and 32) for current switching are absent.

The stepping motor driver 2 is a driver that controls driving of the stepping motor 3. Six signal lines are connected to IN0, IN1, IN2, IN3, PHA, and PHB of the stepping motor driver 2, and the other ends of the signal lines are connected to the MPU 207. IN0, IN1, IN2, and IN3 indicate input pins for setting an excitation current, and a PHA input pin and a PHB input pin are input pins for controlling the phase of phase A and phase B, respectively. Moreover, an REF input pin is an input pin for setting a maximum current value. In a state in which a maximum excitation current is set, a voltage divided by a resistor 33 and a resistor 34 is applied to this REF input pin. 35 indicates a resistor for detecting a current that is caused to flow in phase A. Moreover, 36 indicates a resistor for detecting a current that is caused to flow in phase B.

The stepping motor driver 2 and the MPU 207 function as a driving control apparatus that drives a stepping motor by switching the excitation current supplied to a coil of a predetermined phase between a first excitation current value, a second excitation current value greater than the first value, and a third excitation current value still greater than the second value.

Figures 3, 4A:
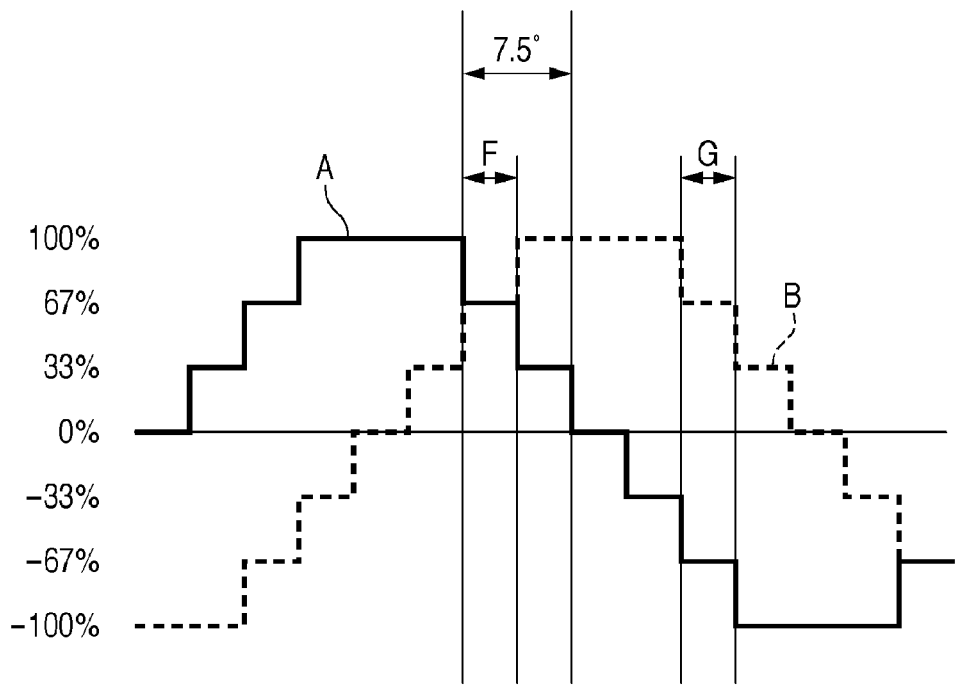
FIG. 3 is a truth table according to the embodiment of the present invention.
FIG. 4A is a diagram showing the principle of a motor according to the embodiment of the present invention.

FIG. 3 is a truth table showing the relationship between the input pins (IN0, IN1, IN2, and IN3) of the stepping motor driver 2 and the excitation current. When IN0 and IN1 are both 0, the value of a current that is caused to flow in phase A becomes 100% with respect to the maximum current value. In this specification, this is referred to as the third excitation current value. When IN0 is 1 and IN1 is 0, the current value becomes 67%, which is referred to as the second excitation current value. When IN0 is 0 and IN1 is 1, the current value becomes 33%, which is referred to as the first excitation current value. When IN0 is 1 and IN1 is 1, the current value becomes 0%, that is, the excitation current becomes 0. It should be noted that as to a phase B excitation current, "IN0" and "IN1" for phase A are replaced with "IN2" and "IN3", respectively.

Figure 4B:
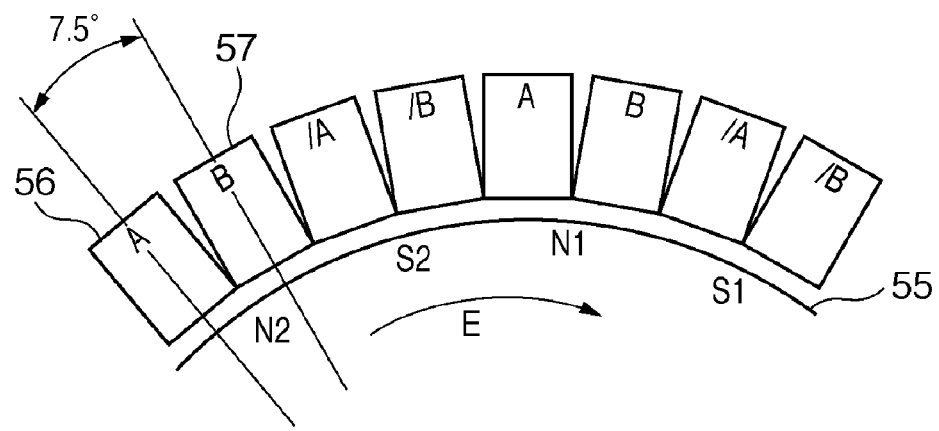
FIG. 4B is a diagram showing the principle of the motor according to the embodiment of the present invention.
Figure 4C:
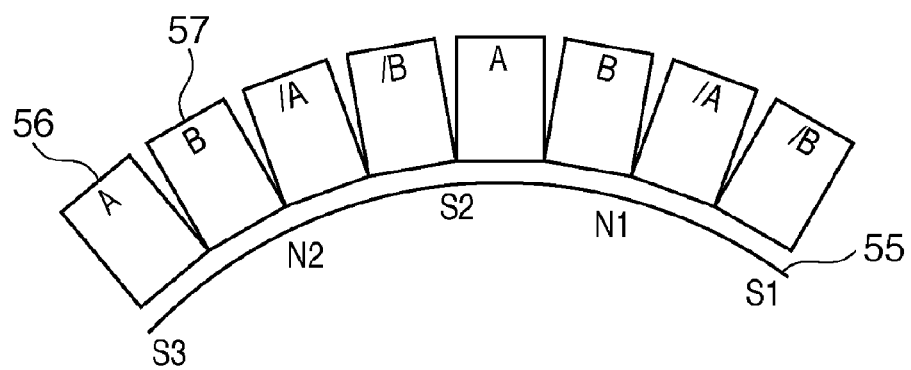
FIG. 4C is a diagram showing the principle of the motor according to the embodiment of the present invention.

FIGS. 4A to 4C are diagrams showing the principle of a stepping motor. FIG. 4A shows waveforms of excitation currents of a conventional 1-2 phase excitation system, where A indicates a phase A excitation current waveform, and B indicates a phase B excitation current waveform.

FIG. 4B is a diagram illustrating the relationship between electromagnetic coils 56 and 57 and a rotor 55. The rotor 55 is a permanent magnet and is magnetized with N poles and S poles equidistantly arranged in the circumferential direction of the rotor 55 as shown in FIG. 4B. Moreover, the electromagnetic coil 56 and the electromagnetic coil 57 are formed by winding a copper wire so that the coil becomes an S pole when an electric current flows in the positive direction. FIG. 4B shows the state at step F in FIG. 4A, and a +67% excitation current is supplied in each of phase A and phase B. At this time, the electromagnetic coil 56 and the electromagnetic coil 57 become S poles, so that an N pole (N2) of the permanent magnet of the rotor 55 is attracted to a midpoint between phase A and phase B.

FIG. 4C is a diagram illustrating the relationship between the electromagnetic coils 56 and 57 and the rotor 55 upon proceeding to step G in FIG. 4A. In phase A, a −67% excitation current is supplied and so the coils change to N poles, and in phase B a +67% excitation current is supplied and so each B is an S pole. Then, N2 in FIG. 4B rotates in the direction of arrow E and moves to the position of N2 in FIG. 4C. As a result of sequentially repeating this process at each step, the stepping motor rotates. It should be noted that the step angle of the fixing motor 3 of the present embodiment is 7.5° in the case of 2-phase excitation. Therefore, in the case of 1-2 phase excitation of the present embodiment, the step angle is 3.75°.

FIG. 5 is a diagram showing waveforms of excitation currents supplied to the stepping motor of the present embodiment. The vertical axis represents the excitation current value, and the horizontal axis represents the control clock (hereinafter simply referred to as clock). In FIG. 5, the time of starting and the time of paper entry correspond to a portion to the left of Tr. ON, and a normal driving period corresponds to a portion to the right of Tr. ON. Moreover, for purposes of comparison, waveforms (Graph 5a) of a conventional example, waveforms shown in Graph 5b that present a problem of the present embodiment, and waveforms (Graph 5c) for solving the problem of the present embodiment are shown in this order from the top.

Conventionally, the excitation current waveforms (Graph 5a) have been realized using a transistor. In contrast, when an improvement is made by removing the transistor, the excitation current waveforms shown in Graph 5b are obtained. According to Graph 5b, in the case where an improvement has been made by removing the transistor, switching of the current values at normal times is performed using only the first and second excitation currents at the same timings as those of the conventional example, in order to realize reductions in vibration and temperature rise without using a transistor. In the case where driving is controlled in this manner, although the load on the MPU 207 is unchanged from that of the conventional example, the torque margin decreases in the normal state. It should be noted that the torque margin is a measure indicating an amount by which a torque that a stepping motor can generate is more than a currently generated torque. Therefore, when the torque that a stepping motor can generate diminishes, the torque margin also diminishes in conjunction with that torque. Moreover, this can also be rephrased as "when the torque margin diminishes, the torque that a stepping motor can generate diminishes".

Also, Graph 5c at the bottom shows the excitation current waveforms according to the present embodiment, where the torque problem with Graph 5b has been mitigated. Here, the stepping motor is driven by controlling the excitation current waveforms using switching timings indicated by 2A (the solid line) and 2B (the dashed line). In the present embodiment, in a mode in which a required driving force of the stepping motor is large (a first mode for generating a first driving force), that is, in a heavy load mode at the time of starting the fixing motor 3 and at the time of entry of the recording paper 30, the first through third excitation current values are sequentially switched step by step to perform excitation (in FIG. 5, to the left of Tr. ON).

On the other hand, in a normal driving mode (a second mode for generating a second driving force) in which the required driving force is relatively small, that is, in a low load mode, the first excitation current value, the second excitation current value, and a zero excitation current are switched. More specifically, the excitation current values are sequentially switched at such timings that the overall pattern of the current variation approximates a sinusoidal wave (i.e., at timings different from those of the conventional example) to drive the stepping motor. Thus, in the present embodiment, the MPU 207 increases the number of clocks per cycle from the conventional 16 clocks to 128 clocks so as to be able to make the controlling steps at normal times more similar to a sinusoidal wave. More specifically, in the low load mode, the excitation current values are switched at such timings that in a single cycle of driving with the excitation current, the time for which the second excitation current value is applied is longer than ¾ and shorter than ⁵⁄₂ of the time for which the first excitation current value is applied.

It should be noted that the excitation current waveforms during normal driving of Graph 5b are waveforms in the case where the time for which the second excitation current value is applied is ¾ of the time for which the first excitation current value is applied. Moreover, in Graph 5b, a case where the application time of the second excitation current value (67%) is extended by one clock on either side (assuming 16 clocks per cycle) is equivalent to a case where the time for which the second excitation current value is applied is ⁵⁄₂ of the time for which the first excitation current value is applied.

Figure 7A:
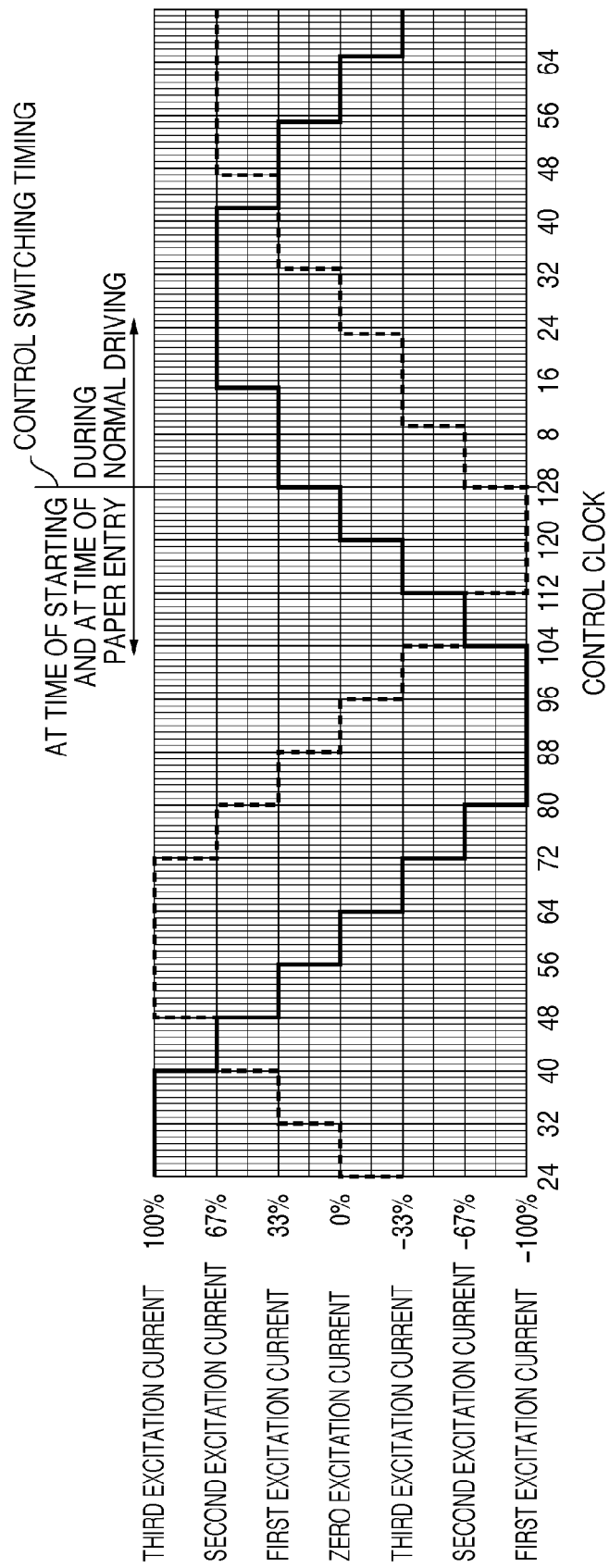
FIG. 7A is an enlarged diagram of an excitation current waveform according to the embodiment of the present invention.

Moreover, a shift from control in which excitation is performed using the first through third excitation currents (the first mode) to control at normal times in which switching is performed between the first excitation current and the second excitation current (the second mode) is performed at a clock (timing) when the status of the excitation current value is a predetermined status. Although the details will be described later, specifically, a clock (timing) at which the ratio between the phase A and phase B excitation current values is the same before and after mode conversion can be used as a clock at which mode switching is performed. In FIG. 7A, the mode is switched at a 0th, that is, 128th clock as one such example.

Figure 6:
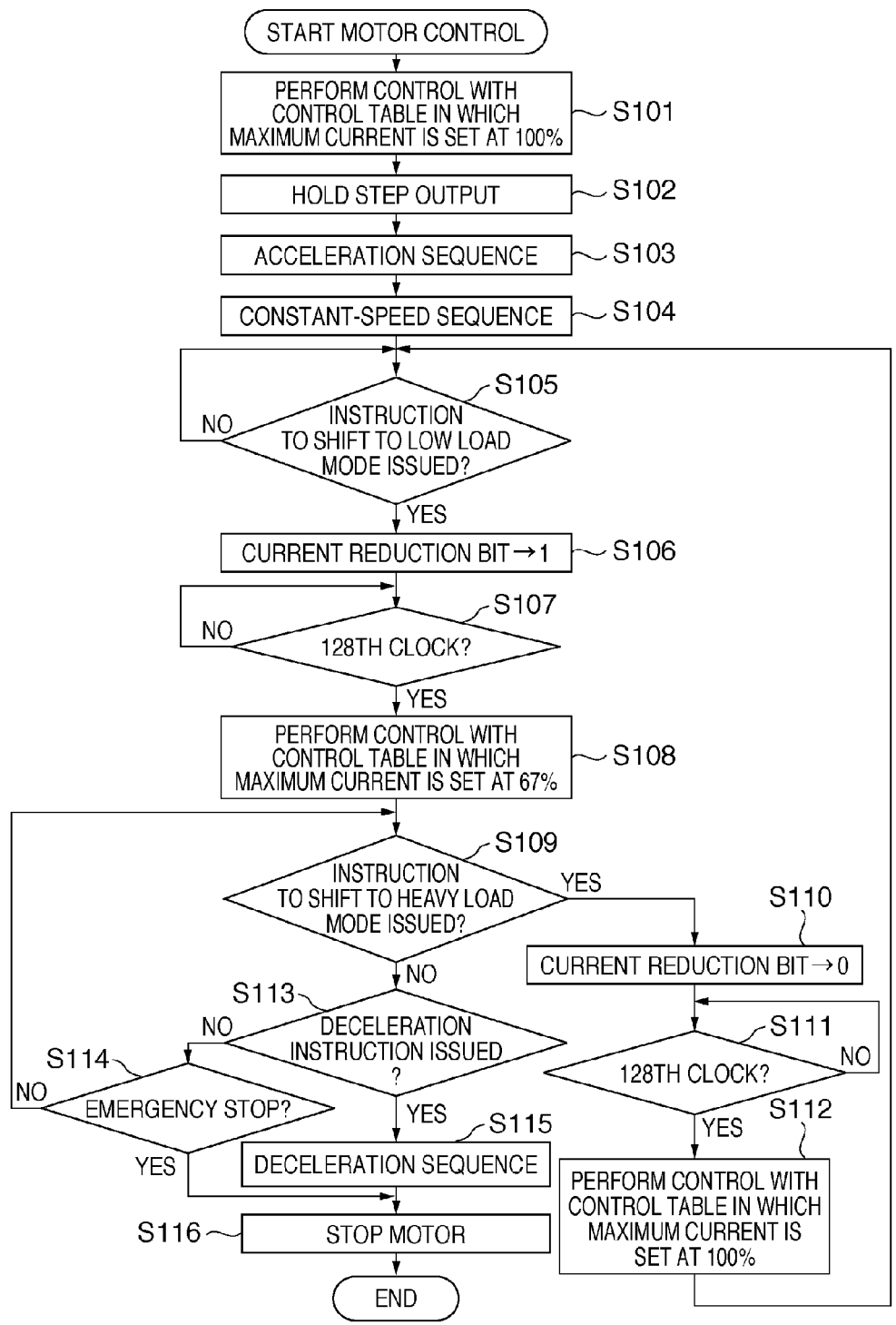
FIG. 6 is a flowchart showing an operation procedure according to the embodiment of the present invention.

Next, a process for switching the driving mode of the stepping motor will be described. FIG. 6 is a flowchart of the process. Processing in each step is executed by either one of the MPU 207 and the stepping motor driver 2 or by both in cooperation.

First, in step S101, control is performed using an excitation current control table in which the maximum current is set at 100%. Here, the first step is held for 0.2 seconds (step S102).

After that, the control table is set, and an acceleration sequence is performed (step S103). When a setting speed has been reached, a constant-speed sequence is performed (step S104).

Then, in step S105, it is determined whether or not an instruction to shift to the low load mode has been issued. For example, a time period for which the excitation current value is set to 435 mA in FIG. 9 (described later) corresponds to the low load mode. If an instruction to shift to the low load mode has been issued (YES in step S105), 1 is set in a current reduction bit (step S106). Thereafter, in step S107, it is determined whether or not a 128th clock (0th clock) has been reached. In this step S107, it is determined whether or not the status of the excitation current value has become a predetermined status, using the clock as a parameter. Here, switching from the heavy load mode to the low load mode is made in the case where the monitored clock is the clock at which the excitation current value is the predetermined status.

Then, after the 128th clock (0th clock) has been reached (YES in step S107), control is performed using an excitation current control table in which the maximum current is set at 67% (step S108). It should be noted that the control table that is referred to in this step S108 is shown in FIG. 7B (described later).

After that, in step S109, it is determined whether or not an instruction to shift to the heavy load mode has been issued. For example, an instruction to shift to the heavy load mode is generated prior to the timing when the fixing motor is started or the timing when the recording paper 30 enters a fixing unit (described later referring to FIG. 9). If an instruction to shift to the heavy load mode has been issued (YES in step S109), the current reduction bit is changed to 0 (step S110).

After that, in step S111, it is determined whether or not a 128th clock (0th clock) has been reached. Then, after the 128th clock (0th clock) has been reached (YES in step S111), control is performed using the control table in which the maximum current is set at 100% (step S112). Also in this step S111, similarly to the previous step S107, it is determined whether or not the status of the excitation current value has become a predetermined status, using the clock as a parameter.

If the result of determination in S109 is that it is not the timing for a shift to the heavy load mode, it is next determined whether or not a deceleration instruction has been issued (step S113). At this time, if a deceleration instruction has been issued, a deceleration sequence is performed (step S115), and the motor is stopped (step S116).

In S114, if an emergency stop is required due to a paper jam, an open door, or the like, the deceleration sequence is omitted and the process is advanced to S116 to immediately stop the motor, because safety is considered important even though the noise increases during the emergency stop.

If the result of determination in S114 is that an emergency stop is not required, the process is returned to S109. If the result of determination in S109 is that it is the timing for heavy load, the current reduction bit is changed to 0 (S110).

Then, after a 128th clock (0th clock) has been reached (S111), control is performed using the control table in which the maximum current is set at 100% (S112). Thereafter, the process proceeds to S105, and the timing for a shift to low load is waited for.

Here, if table switching is performed at an arbitrary timing, for example, if switching from the setting in which the maximum current is at 100% to the setting in which the maximum current is at 67% is performed immediately after S106 without waiting for the 128th clock, a loss of synchronism becomes more likely to occur. The reason for this is that if the excitation current control tables are switched at a clock at which the status of the excitation current value does not meet a certain condition, the torque margin decreases and hence a loss of synchronism is more likely to occur. Hereinafter, this will be described in detail using FIG. 7A.

In a period from a 24th clock to a 32nd clock in FIG. 7A, the phase B excitation current is 0 and the phase A excitation current is at 100% at the time of starting and at the time of paper entry (during the heavy load mode). Moreover, the phase B excitation current is 0 and the phase A excitation current is at 67% during normal driving (during the low load mode). As another example, in a period from a 43rd clock to a 46th clock, both the phase A and phase B excitation currents are at 67% at the time of starting and at the time of paper entry (during the heavy load mode). Moreover, both the phase A and phase B excitation currents are at 33% during normal driving (during the low load mode). With respect to the balance between a force of a stator (the electromagnetic coil 56) of phase A that attracts the rotor 55 and a force of a stator (the electromagnetic coil 57) of phase B that attracts the rotor 55, if a balance achieved by the excitation current values obtained from the table before conversion is the same as a balance achieved by the excitation current values obtained from the table after conversion, a sufficient torque margin can be secured even after the switching. This applies to both of the switching from the heavy load mode to the low load mode and the switching from the low load mode to the heavy load mode.

On the other hand, in the case where it is configured so that switching is immediately performed in response to an external interrupt, and an interrupt occurs in a period from a 34th clock to a 39th clock, the phase B excitation current is at 33%, and the phase A excitation current is at 100%, which is three times the phase B excitation current, at the time of starting and at the time of paper entry (during the heavy load mode). During normal driving (during the low load mode), the phase B excitation current is at 33%, and the phase A excitation current is at 67%, which is twice the phase B excitation current. In this manner, with respect to the balance between the force of the stator (the electromagnetic coil 56) of phase A that attracts the rotor 55 and the force of the stator (the electromagnetic coil 57) of phase B that attracts the rotor 55, if a balance achieved by the excitation current values obtained from the table before conversion and a balance achieved by the excitation current values obtained from the table after conversion are significantly different, a sufficient torque margin cannot be secured after the switching. It should be noted that if the balance between the attraction forces is different before and after mode switching, the behavior of the stepping motor becomes unstable. It has been confirmed that this causes the situation in which a sufficient torque margin can no longer be secured. This applies to both of the switching from the heavy load mode to the low load mode and the switching from the low load mode to the heavy load mode.

Accordingly, in the process of the flowchart in FIG. 6, table switching is performed at a predetermined clock (128th clock) at which switching of the excitation current control tables can be performed stably. Thus, the following effects can be obtained: the processing load on the MPU 207 can be reduced, the software can be simplified, and the ROM capacity for storing the software can be decreased. On the other hand, even when switching is performed at another clock with an increased load on the MPU 207, the switching takes only about 0.05 seconds in terms of time because the number of clocks per cycle is 128. If a maximum of this amount of time can be sacrificed, there is substantially no problem with this processing.

Meanwhile, as described above, there is a plurality of time segments in which table switching from the excitation current control table of either one of the low load mode and the heavy load mode to the excitation current control table of the other mode can be performed stably. Any clock in the plurality of time segments can be chosen as one of a plurality of candidates. In the example in FIG. 7A, a time segment from the 24th clock to the 32nd clock and a time segment from the 43rd clock to the 46th clock correspond to the plurality of time segments in which switching of the driving mode of the stepping motor 3 can be performed stably. Then, an arbitrary clock in each of the time segments can be chosen as a candidate clock for mode switching. Therefore, if an instruction to switch the driving mode of the stepping motor 3 has been issued (e.g., YES in step S105), the first time segment reached after that instruction can be selected so as to stand by until one of the timings (clocks) included in the selected time segment is reached. As a result, the effect that the time required for the mode switching can be further shortened can be obtained in addition to the above-described effects.

Next, a description will be given using FIGS. 7A and 7B. In the present embodiment, the MPU 207 increases the number of clocks per cycle from the conventional number, 16, to 128 so as to make the controlling steps at normal times more similar to a sinusoidal wave. Then, during normal driving, the minimum interval (e.g., 1/128) between current value changing timings is set to 1/n (e.g., 1/8) of the interval (e.g., 1/16) during under heavy load.

Here, with respect to phase A during normal driving, switching from the first excitation current to the second excitation current is performed at a 16th clock, and switching from the second excitation current to the first excitation current is performed at a 48th clock. Moreover, switching from the first excitation current to an excitation current OFF is performed at a 56th clock.

FIG. 7B is a diagram showing an example of an excitation current control table in the low load mode in which the maximum current is set at 67%. As described above, in the present embodiment, the case where the MPU 207 executes switching of the excitation current values at appropriate timings by referring to this table is described as an example of driving control of the excitation current. In the present embodiment, the table shown in FIG. 7B is referred to by the MPU 207 in S108, S115, and the like of the flowchart in FIG. 6 (described above) in order to perform control. Specifically, the MPU 207 performs a second setting for the low load mode (for the second mode), by which the timings of switching between the first and second excitation current values are set based on that table. Then, in the low load mode, control is performed so as to switch the excitation current values in accordance with that setting. On the other hand, although not shown in the drawings, there is actually an excitation current control table as shown in FIG. 7B in which the maximum current is set at 100%. Also with respect to the heavy load mode, similarly to the low load mode, the MPU 207 performs a first setting for the heavy load mode (for the first mode) based on this table and switches the excitation current values in accordance with that setting. It should be noted that other than the driving control that uses a table as described in the present embodiment, switching of the excitation current may be executed by, for example, employing a function that can cause the overall pattern of excitation current variation to approximate a sinusoidal wave. In such a case, the MPU 207 can perform the above-described first setting and second setting based on that function.

Hereinafter, details of FIG. 7B will be described. Aout (%) is the percentage of the maximum excitation current of phase A, and Bout (%) is the percentage of the maximum excitation current of phase B. Negative values indicate a sink current flowing to the driver. IN0 and IN1 indicate current control inputs of phase A, and PHA indicates either a source direction from or a sink direction to the driver of the excitation current. Moreover, IN2 and IN3 indicate control inputs of phase B, and PHB indicates either a source direction from or a sink direction to the driver of the excitation current. A "1" in the control input table indicates an "H" level, and a "0" indicates an "L" level.

FIG. 8 is a diagram showing torque characteristics where the conventional example and the problem and countermeasure of the present embodiment are shown. The vertical axis represents the torque (mNm), and the horizontal axis represents the pulse step rate (pps) of the stepping motor. 24 indicates a torque characteristic curve in the case where the motor is driven by performing switching between the second excitation current and the third excitation current using a rate of 16 step clocks per cycle according to the present embodiment (in FIG. 5, normal driving portions of 1A and 1B). 23 indicates a torque characteristic curve in the case where the motor is driven by performing switching using a rate of 128 step clocks per cycle that causes the second excitation current and the third excitation current to approximate a sinusoidal waveform (in FIG. 5, normal driving portions of 2A and 2B). It can be seen that the torque of the stepping motor represented by the torque characteristic curve 23 in the case where the switching timings are changed so as to conform to a sinusoidal wave is higher than that represented by the torque characteristic curve 24.

Application to Fixing Motor

Figure 9:
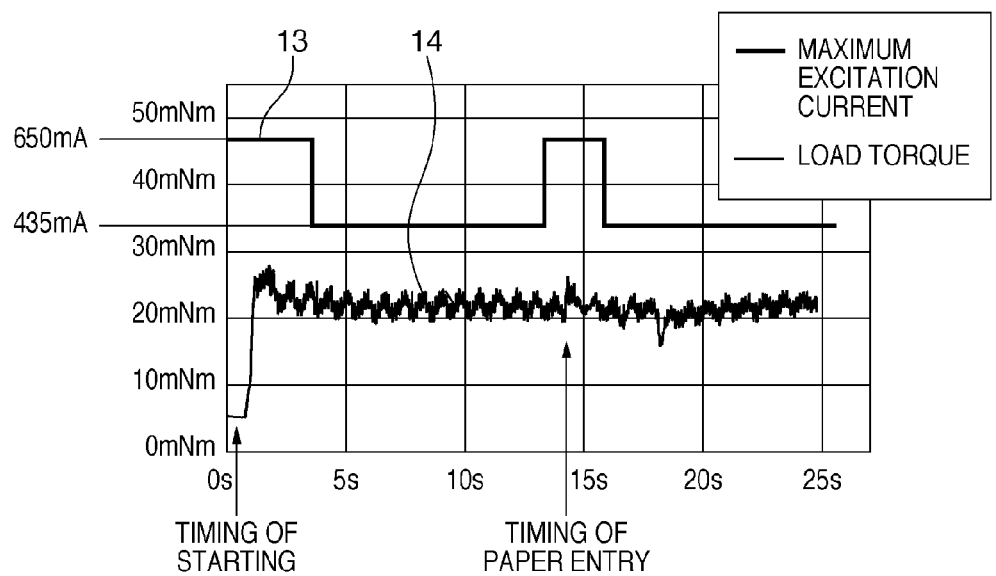
FIG. 9 is a diagram showing an example of waveforms of a maximum excitation current and a load torque of a fixing motor according to the embodiment of the present invention.

FIG. 9 is a diagram showing an example of waveforms of a maximum excitation current and a load torque of a fixing motor according to the present embodiment. It should be noted that the fixing motor is a motor for driving members related to the fixing device 437, for example, the fixing roller 433 and the pressure roller 434 of the fixing device 437.

In FIG. 9, the vertical axis represents the torque (mNm), and the horizontal axis represents the time (s). 13 indicates the maximum excitation current value, and 14 indicates data regarding the load torque. Since the maximum excitation current value is set to 650 mA at the timing of starting and immediately before the recording paper 30 is nipped between the pair of the fixing roller 433 and the pressure roller 434, excitation is performed using the first through third excitation currents. Since the maximum excitation current value is set to 435 mA at other timings during normal rotation, switching is performed at timings at which the second excitation current and the third excitation current approximate a sinusoidal waveform. In other words, as shown by Graph 5c in FIG. 5, the MPU 207 switches the excitation current values in the low load mode at such timings that in a single cycle of driving with the excitation current, the time for which the second excitation current value is applied is longer than ¾ and shorter than ⅚ of the time for which the first excitation current value is applied.

Application to Paper Feed Motor

Figure 10:
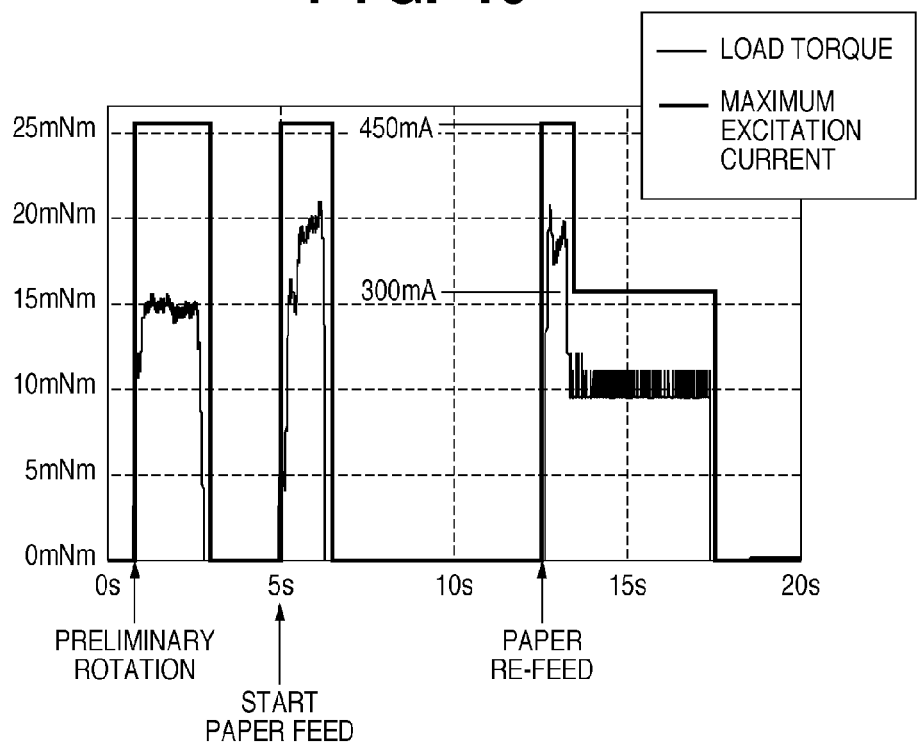
FIG. 10 is a diagram showing an example of waveforms of a maximum excitation current and a load torque of a paper feed motor according to the embodiment of the present invention.

FIG. 10 is a diagram showing an example of waveforms of a maximum excitation current and a load torque of the paper feed motor 1 according to the present embodiment. The vertical axis represents the torque (mNm), and the horizontal axis represents the time (s). The thick line represents the maximum excitation current value, and the thin line represents data regarding the load torque.

At the start of preliminary rotation, the maximum excitation current value is set to 450 mA. After 2.5 seconds, the motor is stopped, and at the timing when paper feed is started, the maximum excitation current value is again set to 450 mA. When the recording paper 30 has reached the position of the registration sensor 408, the motor is temporarily stopped. Thereafter, image formation is performed, and at the timing when a toner image on the photosensitive drum 305Y coincides with the front end of the recording paper 30, the maximum excitation current value is set to 450 mA in order to feed the paper again. After the timing when the front end of the paper has reached a transfer position, the load on the paper feed motor 1 decreases because the recording paper 30 is conveyed to the transfer roller 430Y and the photosensitive drum 305Y, and accordingly the excitation current is reduced to 300 mA. At the timing when the rear end of the recording paper 30 has come out of the registration roller pair 407, the motor is stopped.

The excitation current waveforms are the same as the waveform 2A and the waveform 2B in FIG. 5. In this manner, by applying the present invention also to the paper feed motor 1, it is possible to secure a torque margin of the paper feed motor 1 while suppressing temperature rises of the paper feed motor 1 and the motor driver 2.

As described above, according to the present embodiment, the productivity can be improved without using a transistor, which is a component related to the switching of current settings, while keeping the driving performance of a motor at a certain required level.

Moreover, according to Graph 5c in FIG. 5, the MPU 207 switches the excitation current at timings at which the excitation current has a shape more similar to a sinusoidal wave than in the case of Graph 5b, and thus the driving performance of the motor can be maintained efficiently with a small excitation current. That is to say, in the case of Graph 5c, control can be performed so as to achieve a higher motor torque than in the case of Graph 5b, so that a margin of the torque can be secured. Moreover, since the maximum excitation current value is decreased at normal times (the low load mode), the problem of noise and vibration can be prevented from occurring.

Moreover, with the low load mode of the present embodiment, not only the problem of noise and vibration but the problem of temperature rise can be prevented from occurring.

Other Embodiments

In the first embodiment, a bipolar stepping motor is described by way of example. However, even in the case where a unipolar stepping motor is used and switching of the excitation current is performed, the same effects can be obtained by increasing the number of control clocks of the MPU and performing control by switching the excitation current at timings at which the excitation current has a shape similar to a sinusoidal wave.

In the above description, it is described that, in the first mode for generating a large driving force by the stepping motor, the excitation current value is switched between the first through third excitation current values for the excitation current supplied to the coil of each phase (except for the excitation current being equal to zero). However, it is to be understood that the invention is not limited to the above description. For example, in the first mode, at least the first through third excitation current values can be switched for the excitation current supplied to the coil of each phase (except for the excitation current being equal to zero), and furthermore, other excitation current values can also be prepared for the switching.

More specifically, for example, the input pins (IN0, IN1, IN2 and IN3) are changed into the input pins (IN0, IN1, IN2, IN3, IN4 and IN5) by adding two input pins. Thus, MPU 207 indicates an excitation current value by using three bits for each of the phase A and B. This enables to prepare other excitation current values existing between a 67% excitation current value, a 100% excitation current value, and any of other excitation values described above. Accordingly, the same effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-106945, filed Apr. 24, 2009, and No. 2010-089857, filed Apr. 8, 2010, which are hereby incorporated by reference herein in their entirety.

What is claimed is:

1. A driving control apparatus for driving a stepping motor by switching an excitation current supplied to a coil of a predetermined phase between a first excitation current value, a second excitation current value greater than the first excitation current value, and a third excitation current value still greater than the second excitation current value, the driving control apparatus comprising:
a driving control unit that sequentially switches, for the supplied excitation current, at least the first through third excitation current values in a first mode for generating a first driving force by the stepping motor, and
sequentially switches, for the supplied excitation current, the first and second excitation current values in a second mode for generating a second driving force smaller than the first driving force,
wherein, in the second mode, the driving control unit sequentially switches the excitation current values at such timings that in a single cycle of driving with the excitation current, a time for which the second excitation current value is applied is longer than ¾ and shorter than 5/2 of a time for which the first excitation current value is applied.

2. The driving control apparatus for a stepping motor according to claim 1, further comprising:
   a first setting unit that sets switching timings of the first through third excitation current values for the first mode; and
   a second setting unit that sets switching timings of the first and second excitation current values for the second mode,
   wherein the driving control unit switches the excitation current values at the switching timings set by the first setting unit in the first mode and at the switching timings set by the second setting unit in the second mode.

3. The driving control apparatus for a stepping motor according to claim 1, further comprising:
   a selecting unit that selects out of a plurality of candidates a timing of switching from either one of the first mode and the second mode to the other mode,
   wherein the driving control unit performs switching to the other mode according to the timing selected by the selecting unit and applies an excitation current value.

4. The driving control apparatus for a stepping motor according to claim 1, further comprising:
   a determination unit that determines whether or not an excitation current value has become a predetermined status when switching from either one of the first mode and the second mode to the other mode is to be performed,
   wherein if the determination unit determines that the excitation current value has become the predetermined status, the driving control unit starts switching of the excitation current values in accordance with the other mode.

5. An image forming apparatus comprising:
   the driving control apparatus according to claim 1; and
   a motor for sheet conveying that is controlled by the driving control apparatus.

6. An image forming apparatus comprising:
   the driving control apparatus according to claim 1; and
   a motor for fixing an image that is controlled by the driving control apparatus.

* * * * *